United States Patent
Ito et al.

(10) Patent No.: US 10,505,620 B2
(45) Date of Patent: Dec. 10, 2019

(54) RECEIVING APPARATUS AND RECEIVING METHOD, AND PROGRAM AND RECORDING MEDIUM

(71) Applicant: Mitsubishi Electric Corporation, Tokyo (JP)

(72) Inventors: Naosuke Ito, Tokyo (JP); Daisuke Shimbo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/079,508

(22) PCT Filed: Jan. 23, 2017

(86) PCT No.: PCT/JP2017/002101
§ 371 (c)(1),
(2) Date: Aug. 23, 2018

(87) PCT Pub. No.: WO2017/179259
PCT Pub. Date: Oct. 19, 2017

(65) Prior Publication Data
US 2019/0068273 A1 Feb. 28, 2019

(30) Foreign Application Priority Data
Apr. 12, 2016 (JP) ................. 2016-079654

(51) Int. Cl.
*H04K 1/10* (2006.01)
*H04L 27/28* (2006.01)
(Continued)

(52) U.S. Cl.
CPC ............... *H04B 7/10* (2013.01); *H01Q 21/24* (2013.01); *H04B 17/364* (2015.01); *H04J 11/00* (2013.01)

(58) Field of Classification Search
CPC ...... H04B 7/10; H04B 17/364; H04B 7/0617; H04B 7/086; H01Q 21/24; H01Q 3/26; H04J 11/00; G01S 3/74; H04L 25/0202
(Continued)

(56) References Cited

U.S. PATENT DOCUMENTS 6,717,979 B2 * 4/2004 Ribeiro Dias ............ G01S 3/74
375/150
2001/0049295 A1 * 12/2001 Matsuoka ............ H04B 7/0617
455/562.1
(Continued)

FOREIGN PATENT DOCUMENTS

JP 2010-66235 A 3/2010
JP 2010-286403 A 12/2010
(Continued)

OTHER PUBLICATIONS

Kikuma, "Adaptive Signal Processing by Array Antenna", Published by Kagaku Gijutsu Shuppan, Nov. 1998, pp. 274-277, (Total No. pp. 1-7).

*Primary Examiner* — Phuong Phu
(74) *Attorney, Agent, or Firm* — Birch, Stewart, Kolasch & Birch, LLP

(57) ABSTRACT

In receiving radio waves from a transmitter by an array antenna, and estimating an arrival direction of a direct wave, delay times of the arriving waves are estimated (13) by means of a super-resolution process based on transmission channel estimation results, an arriving wave component corresponding to the delay time having been determined to be equal to or longer than a threshold value is removed (15) from the transmission channel estimation results, arriving wave components after the removal are separated from each other to extract direct wave components (17), and an arrival angle is estimated (19). The arrival direction of the direct wave can be accurately estimated in an environment where delayed waves of short delay times are present. Also, the amount of calculation is small even when the super-resolution process is performed.

12 Claims, 12 Drawing Sheets

(51) Int. Cl.
  *H04B 7/10*   (2017.01)
  *H04B 17/364*  (2015.01)
  *H01Q 21/24*  (2006.01)
  *H04J 11/00*  (2006.01)

(58) Field of Classification Search
  USPC .............................. 375/260, 346, 347, 349
  See application file for complete search history.

(56) References Cited

U.S. PATENT DOCUMENTS

| | | | | |
|---|---|---|---|---|
| 2003/0210670 | A1* | 11/2003 | kisigami | G01S 3/74 370/335 |
| 2004/0174300 | A1* | 9/2004 | Nakagawa | H01Q 3/26 342/377 |
| 2005/0250564 | A1* | 11/2005 | Kishigami | H04B 7/086 455/575.7 |
| 2007/0054623 | A1* | 3/2007 | Sato | H04B 7/0617 455/67.11 |
| 2010/0090900 | A1* | 4/2010 | Mitsumoto | G01S 3/74 342/417 |
| 2017/0338900 | A1* | 11/2017 | Shimbo | H04B 7/10 |
| 2018/0287822 | A1* | 10/2018 | Wang | H04L 25/0202 |

FOREIGN PATENT DOCUMENTS

| | | |
|---|---|---|
| JP | 2011-160446 A | 8/2011 |
| JP | 4833144 B2 | 12/2011 |

* cited by examiner

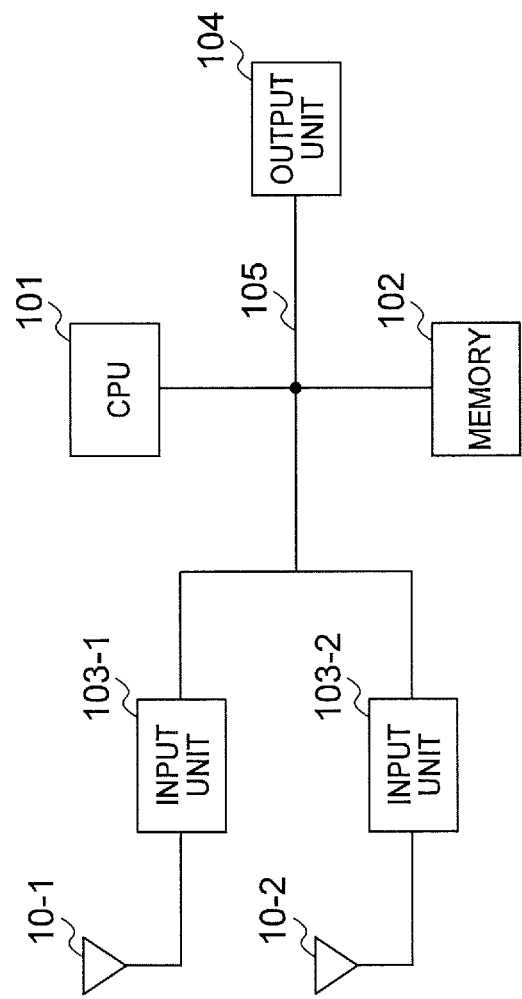

(1)

RECEIVING APPARATUS AND RECEIVING METHOD, AND PROGRAM AND RECORDING MEDIUM

TECHNICAL FIELD

The present invention relates to a receiving method and a receiving apparatus, and, in particular, to a technique for receiving radio waves transmitted from a transmitter, and identifying the arrival direction of the direct wave based on the received signal. The present invention also relates to a program for causing a computer to execute the processes in the above-mentioned receiving apparatus or receiving method, and a computer-readable recording medium in which the above-mentioned program is recorded.

BACKGROUND ART

When receiving radio waves of a mobile phone, a wireless LAN, terrestrial digital broadcasting, or the like, the reception performance is degraded due to the effects of the arriving waves (hereinafter called "delayed waves"), which arrive after reflection or scattering on buildings, vehicles, or the like, in addition to the arriving wave (hereinafter called "a direct wave") which arrives directly from the transmitter. An environment in which a plurality of arriving waves are present is called a multipath environment.

A known technique to reduce the degradation in the performance due to multipath is a directivity control using an array antenna. An array antenna has a plurality of antenna elements, and can be made to have a directivity by controlling weighting coefficients used for combining signals received by the antenna elements. In a multipath environment, the degradation in the performance due to the influence of the delayed waves can be mitigated by controlling the directivity so that the main lobe is directed to the direction in which the direct wave arrives. In order to improve the reception performance by the directivity control of the array antenna, it is necessary to accurately estimate the direction in which the direct wave arrives.

If the receiver is fixed, and the direction of the transmitter is known in advance, the directivity may be manually adjusted so that the main lobe of the array antenna is directed to the transmitter. When the radio waves are received at a moving body such as a vehicle, for instance, in a case of reception in an inter-vehicle communication, manual adjustment is not feasible because the position of the transmitter relative to the receiving apparatus changes with the movement of the vehicle. It is therefore necessary to automatically estimate the arrival direction of the direct wave, from the received signal in which the direct wave and the delayed waves are multiplexed.

Radio wave environments for the wireless communications can be classified into LOS (Line Of Sight) in which the transmitter is in a visual line of sight from the receiver, and NLOS (None Line Of Sight) in which there is no visual line of sight between the transmitter and the receiver. The present invention assumes the LOS environment.

Patent Reference 1 describes an apparatus in which the multipath arrival directions are measured based on signals received by two antennas. In this apparatus, the frequency characteristic (transfer function in the frequency domain) of the transmission channel is estimated from the signal received by each antenna element, the estimated transmission channel frequency characteristic is inverse-Fourier transformed to determine a complex delay profile, the arriving waves of different delay times are separated from the complex delay profile, and the arrival angle is estimated on the basis of the phase difference between the separated direct waves received by the antenna elements.

Patent Reference 2 discloses estimation of the delay times by a super-resolution process, such as an MUSIC (MUltiple SIgnal Classification) process, or an ESPRIT (Estimation of Signal Parameters via Rotational Invariance Techniques) process. According to the technique described in Patent Reference 2, the signals received by a plurality of antennas are transformed into a frequency spectrum, the delay time of each arriving wave is estimated by a super-resolution process using the frequency spectrum, the estimation results are used to estimate a coefficient matrix in which the arriving waves are included, the above-mentioned frequency spectrum is multiplied by a pseudo-inverse matrix of the above-mentioned coefficient matrix to separate the components of the direct waves, and the arrival angle is estimated from the phase differences among the separated direct waves.

PRIOR ART REFERENCES

Patent References

Patent reference 1: U.S. Pat. No. 4,833,144 (FIG. 1)
Patent reference 2: Patent publication No. 2010-286403 (FIG. 1)
Non-patent reference 1: N. Kikuma, "Adaptive Signal Processing by Array Antenna," Published by Kagaku Gijutsu Shuppan, November 1998.
Non-patent reference 1 will be referred to later.

SUMMARY OF THE INVENTION

Problems to be Solved by the Invention

The technique shown in Patent Reference 1 is associated with a problem in that the direct wave and the delayed waves cannot be separated when the delay times are short. For example, when a building, a vehicle or the like is present in the neighborhood of the receiver, there is no significant difference in the length of the radio wave propagation path from the transmitter to the receiver between the direct wave and the delayed waves, so that delay times are very short. If the delay times are shorter than the delay time resolution of the complex delay profile, the direct wave and the delayed waves overlap each other in the estimated complex delay profile, and cannot be separated from each other. As a result, the arrival angle estimation accuracy is lowered substantially. For example, the delay time resolution of the complex delay profile estimated when receiving the signal of a bandwidth of 10 MHz is in the order of 100 ns which is a reciprocal of the bandwidth. If a vehicle or the like is present at a distance of 3 m in a direction opposite to the transmitter, as seen from the receiver, the delay time with respect to the direct wave is $$\tau = 3 \times 2/c = 20 \text{ ns}.$$

Here, c denotes the speed of light (about $3 \times 10^8$ m/s). The delay time, 20 ns, is shorter than the delay time resolution, 100 ns, and the direct wave and the delayed wave overlap each other in the estimated delay profile, with the result that the accuracy of estimation of the arrival angle is lowered.

The method disclosed in Patent Reference 2 is associated with a problem that the amount of the processes necessary to separate the arriving wave, in particular the amount of the calculation of the pseudo-inverse matrix is large.

An object of the present invention is to provide a receiving apparatus and method which can accurately estimate the arrival angle of the direct wave in an environment in which delayed waves of short delay times are present, and with which the amount of required calculation can be reduced.

Means of Solving the Problem

A receiving apparatus according to the present invention is for receiving radio waves transmitted from a transmitter, and estimating an arrival angle of a direct wave from the transmitter, comprising:

first to N-th (N being an integer not less than 2) wireless reception units provided respectively corresponding to first to N-th antenna elements forming an array antenna, and performing frequency conversion and AD conversion on first to N-th analog signals obtained by receiving the radio waves by said first to N-th antenna elements, respectively, to output first to N-th digital signals;

first to N-th transmission channel estimation units for estimating transmission channel frequency characteristics based on the first to N-th digital signals, respectively, and outputting first to N-th transmission channel estimation results;

a delay time estimation unit for estimating, by means of a super-resolution process, delay times of one or more arriving waves included in the radio waves, based on a transmission channel estimation result among the first to N-th transmission channel estimation results;

a delay time grouping unit for comparing the delay times estimated by said delay time estimation unit with a threshold value, to determine whether the estimated delay times are shorter than the threshold value;

first to N-th delayed wave removal units provided respectively corresponding to said first to N-th transmission channel estimation units, removing, from the first to N-th transmission channel estimation results, an arriving wave component corresponding to the delay time which said delay time grouping unit has determined to be equal to or more than the threshold value, and outputting first to N-th transmission channel frequency characteristics pertaining to the arriving waves of the delay times which said delay time grouping unit has determined to be shorter than the threshold value;

first to N-th arriving wave separation units provided respectively corresponding to said first to N-th delayed wave removal units, and respectively separating, from each other, arriving wave components included in the first to N-th transmission channel frequency characteristics to extract first to N-th direct wave components; and an arrival angle estimation unit for estimating an arrival angle of the direct wave based on a phase difference among the first to N-th direct wave components.

Effects of the Invention

According to the present invention, the direct wave and the delayed wave are separated after estimating the delay times by a super-resolution process, so that the arrival angle of the direct wave can be accurately estimated even in an environment in which a delayed wave of a short delay time is present. Also, the calculation of the pseudo-inverse matrix, etc. is performed after removing a relatively long delay time, so that the amount of calculation can be reduced.

BRIEF DESCRIPTION OF THE DRAWINGS

FIG. 17 is a block diagram showing a computer executing the processes in the first to sixth embodiments.

MODE FOR CARRYING OUT THE INVENTION

First Embodiment

Figure 1:
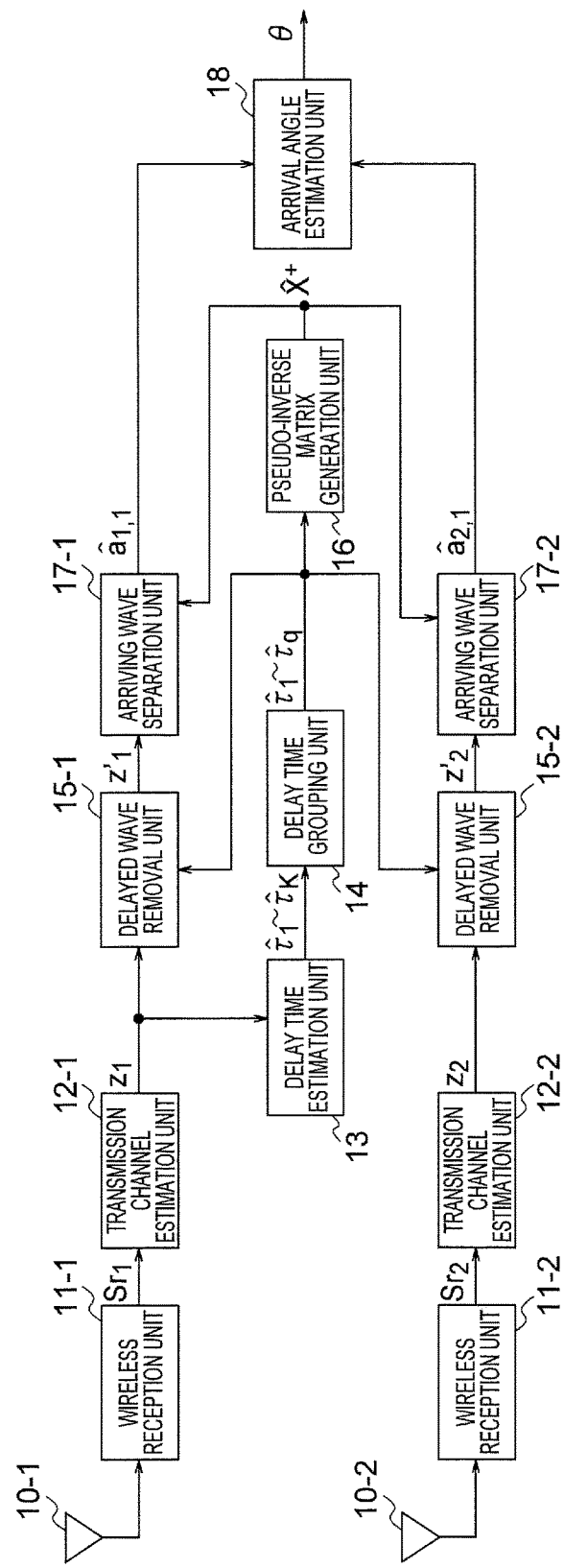
FIG. 1 is a block diagram showing a receiving apparatus of a first embodiment of the present invention.

FIG. 1 shows a receiving apparatus of the present embodiment.

The illustrated receiving apparatus is for receiving radio waves transmitted from a transmitter, and estimating the direction of the transmitter, i.e., the arrival direction of the direct wave.

The illustrated receiving apparatus comprises wireless reception units 11-1, 11-2, transmission channel estimation units 12-1, 12-2, a delay time estimation unit 13, a delay time grouping unit 14, delayed wave removal units 15-1, 15-2, a pseudo-inverse matrix generation unit 16, arriving wave separation units 17-1, 17-2, and an arrival angle estimation unit 18. The wireless reception units 11-1, 11-2 are respectively connected to antenna elements 10-1, 10-2.

The wireless reception unit 11-1, the transmission channel estimation unit 12-1, the delayed wave removal unit 15-1, and the arriving wave separation unit 17-1 form a first system, and are provided corresponding to each other, and also corresponding to the first antenna element 10-1.

The wireless reception unit 11-2, the transmission channel estimation unit 12-2, the delayed wave removal unit 15-2, and the arriving wave separation unit 17-2 form a second system, and are provided corresponding to each other, and also corresponding to the second antenna element 10-2.

The processes in the first system and the processes in the second system are similar. However, the signals input to the respective systems differ (that is they are the signals obtained by the antenna elements 10-1, 10-2, respectively).

The delay time estimation unit 13, the delay time grouping unit 14, the pseudo-inverse matrix generation unit 16, and the arrival angle estimation unit 18 are provided in common for the above-mentioned two systems.

The receiving apparatus shown in FIG. 1 has a Configuration for the case where the number of the antenna elements is two. The present invention is applicable even when the number of the antenna elements is three or more, so that, in the following description, the number of antenna elements may sometimes be represented by N.

The wireless reception units 11-1, 11-2 in FIG. 1 are provided respectively corresponding to the antenna elements 10-1, 10-2, and each frequency-convert the analog signal obtained by reception of the radio waves at the corresponding antenna element, into a baseband signal, AD-convert the baseband signal to generate a digital signal $Sr_n$ (n being 1 or 2), and output the generated digital signal $Sr_n$.

The transmission channel estimation units 12-1, 12-2 in FIG. 1 are provided respectively corresponding to the wireless reception units 11-1, 11-2, and each estimate the frequency characteristic (transfer function in the frequency domain) of the transmission channel, on the basis of the digital signal $Sr_n$ output from the corresponding wireless reception unit.

The method of estimating the transmission channel frequency characteristic depends on the transmission scheme adopted by the communication system. The present invention is applicable to any transmission scheme. However, the following description relates to a case in which the OFDM (Orthogonal Frequency Division Multiplex) transmission scheme is adopted, and a case in which the DSSS (Direct Sequence Spectrum Spread) transmission scheme is adopted. The OFDM transmission scheme and the DSSS transmission scheme are adopted in many communication systems.

First, description is made of a case in which the OFDM transmission scheme is adopted. In the OFDM transmission scheme, symbols are generated by multiplexing a plurality of subcarriers which are orthogonal with each other, and transmission is performed symbol by symbol. In many of the communication systems in which the OFDM transmission scheme is adopted, part of the subcarriers are used as pilot subcarriers which are known at the transmission side and the reception side, in order to compensate for the transmission channel distortion at the reception side. In the present embodiment, the pilot subcarriers are used to estimate the transmission channel frequency characteristic.

Figure 2:
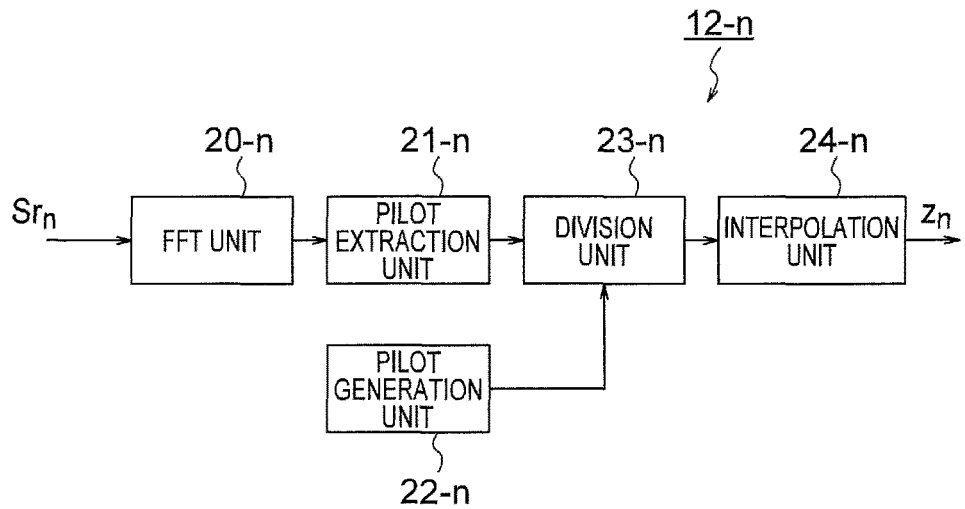
FIG. 2 is a block diagram showing an example of a configuration of the transmission channel estimation unit in FIG. 1.

FIG. 2 shows an example of a transmission channel estimation unit 12-n (n being 1 or 2) used when the OFDM transmission scheme is adopted.

The transmission channel estimation unit 12-n shown in FIG. 2 comprises an FFT unit 20-n, a pilot extraction unit 21-n, a pilot generation unit 22-n, a division unit 23-n, and an interpolation unit 24-n.

The FFT unit 20-n converts the digital signal $Sr_n$ output from the wireless reception unit 11-n shown in FIG. 1, symbol by symbol, from the time axis into the frequency axis, by FFT (Fast-Fourier Transform), thereby to output subcarriers.

The pilot extraction unit 21-n extracts pilot carriers from the subcarriers output from the FFT unit 20-n.

The pilot generation unit 22-n generates pilot carriers known in the receiving apparatus.

The division unit 23-n divides the pilot carriers extracted by the pilot extraction unit 21-n, by the pilot carriers generated by the pilot generation unit 22-n, thereby to output the frequency characteristic of the transmission channel acting on the pilot carriers.

The interpolation unit 24-n performs interpolation based on the frequency characteristics of the transmission channel acting on the pilot carriers in the symbol direction and the subcarrier direction, to obtain frequency characteristics of the transmission channel (transmission channel estimation results) for all the subcarriers.

Next, description is made of a case in which the DSSS transmission scheme is adopted. In the DSSS transmission scheme, signals spread by using a pseudonoise sequence, symbol by symbol, are transmitted, and despread at the reception side.

Figure 3:
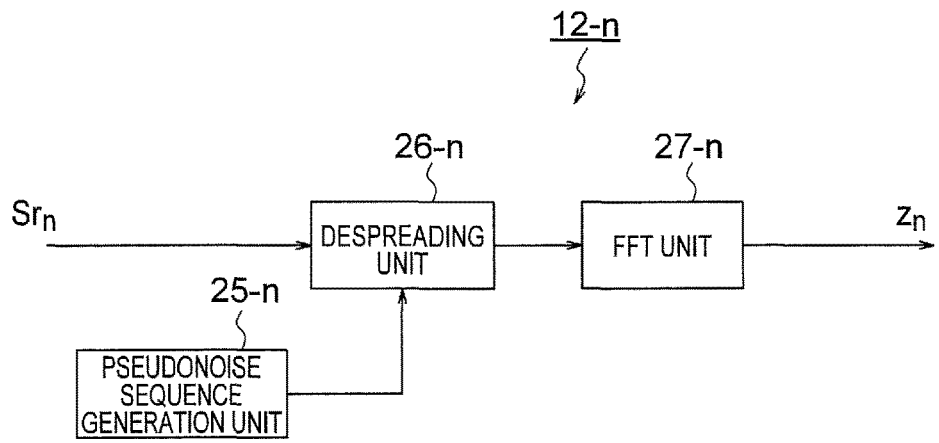
FIG. 3 is a block diagram showing another example of a configuration of the transmission channel estimation unit in FIG. 1.

FIG. 3 shows an example of a transmission channel estimation unit 12-n (n being 1 or 2) used when the DSSS transmission scheme is adopted.

The transmission channel estimation unit 12-n shown in FIG. 3 has a pseudonoise sequence generation unit 25-n, a despreading unit 26-n, and an FFT unit 27-n.

The pseudonoise sequence generation unit 25-n generates a pseudonoise sequence Ns which is identical to the pseudonoise sequence used at the time of spreading at the transmission side.

The despreading unit 26-n calculates a sliding correlation between the digital signal $Sr_n$ output from the wireless reception unit 11-n in FIG. 1, and the pseudonoise sequence Ns, symbol by symbol, and outputs the calculated sliding correlation.

The FFT unit 27-n transforms, by FFT, the output of the despreading unit 26-n into the frequency domain, to obtain the transmission channel frequency characteristic (transmission channel estimation result).

The transmission channel frequency characteristic (transmission channel estimation result) output by the transmission channel estimation unit 12-n can be represented as a column vector consisting of components of respective frequencies $f_1$ to $f_M$, by the following equation (1).

[Mathematical Expression 1]

$$z_n = \begin{bmatrix} z_n(f_1) \\ z_n(f_2) \\ \vdots \\ z_n(f_M) \end{bmatrix} \quad (1)$$

Here, $f_m$ (m being any of 1 to M) denotes a frequency at a point when the range of the lowest frequency $f_1$ to the highest frequency $f_M$ is equally divided into M sections, with the division number M being the number of FFT points at the FFT unit 20-n in FIG. 2 or the FFT unit 27-n in FIG. 3.

Returning to FIG. 1, based on the output of either of the transmission channel estimation units 12-1, 12-2, for example, the transmission channel estimation unit 12-1, the delay time estimation unit 13 estimates the delay times of one or more arriving waves included in the radio waves received by the corresponding antenna element 10-1.

The delay time estimation is performed by a super-resolution process, such as the MUSIC (MUltiple SIgnal Classification) process, the ESPRIT (Estimation of Signal Parameters via Rotational Invariance Techniques) process.

In the following description, the number of the arriving waves is denoted by K, the delay times of the respective arriving waves are denoted by $\tau_1, \tau_2, \ldots \tau_K$, the estimated values of the delay times are denoted by $\tau(\text{hat})_1, \tau(\text{hat})_2, \ldots, \tau(\text{hat})_K$. Here, it is assumed that $\tau_1 < \tau_2 < \ldots < \tau_K$.

The delay time grouping unit 14 compares the delay time estimation results $\tau(\text{hat})_1, \ldots, \tau(\text{hat})_K$ output by the delay time estimation unit 13, with a predetermined threshold value $\tau_{th}$, and determines whether each estimated value $\tau(\text{hat})_k$ is shorter than the threshold value $\tau_{th}$. The delay time grouping unit 14 then groups the estimated values $\tau(\text{hat})_1, \ldots, \tau(\text{hat})_K$, into those $\tau(\text{hat})_1, \ldots, \tau(\text{hat})_q$, which are shorter than the threshold value $\tau_{th}$, and other estimated values $\tau(\text{hat})_{q+1}, \ldots, \tau(\text{hat})_K$ (those which are equal to or longer than the threshold value $\tau_{th}$). Here, it is assumed that the threshold value $\tau_{th}$ is so determined that the relation $\tau(\text{hat})_1 < \tau_{th} < \tau(\text{hat})_K$ is satisfied.

The delay time grouping unit 14 outputs the estimated values $\tau(\text{hat})_1, \ldots, \tau(\text{hat})_q$ having been determined to be shorter than the threshold value $\tau_{th}$, and do not output the estimated values $\tau(\text{hat})_{q+1}, \ldots, \tau(\text{hat})_K$ having been determined to be equal or longer than the threshold value $\tau_{th}$. The delay time grouping unit 14 may alternatively output information indicating whether each estimated value $\tau(\text{hat})_k$ is shorter than the threshold value $\tau_{th}$.

The delayed wave removal units 15-1, 15-2 are provided respectively corresponding to the transmission channel estimation units 12-1, 12-2, and each remove the arriving wave components corresponding to the delay times which the delay time grouping unit 14 has determined to be equal to or longer than the threshold value $\tau_{th}$, from the output of the corresponding transmission channel estimation unit (transmission channel estimation result). That is, each delayed wave removal unit 15-n removes, from the transmission channel frequency characteristic estimation result output from the corresponding transmission channel estimation unit 12-n, the delayed wave components corresponding to the delay times $\tau(\text{hat})_{q+1}, \ldots, \tau(\text{hat})_K$ which the delay time grouping unit 14 has determined to be equal to or longer than the threshold value $\tau_{th}$.

Figure 4:
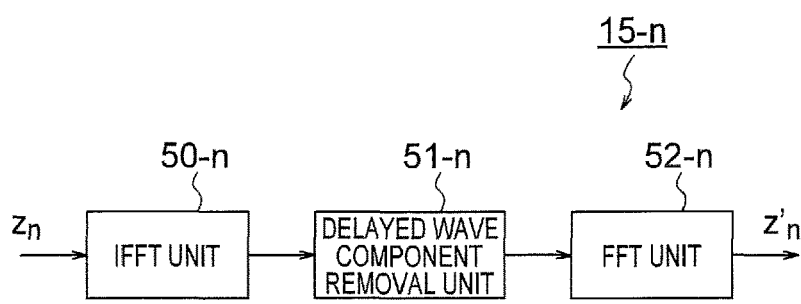
FIG. 4 is a block diagram showing an example of a configuration of the delayed wave removal unit in FIG. 1.

For example, the delayed wave removal unit 15-n comprises an IFFT unit 50-n, a delayed wave component removal unit 51-n, and an FFT unit 52-n, as shown in FIG. 4.

The IFFT unit 50-n performs IFFT (Inverse Fast-Fourier Transform), on the estimation result $z_n$ of the transmission channel frequency characteristic shown in the equation (1), to determine a delay profile. An example of the determined delay profile is shown in FIG. 5(*a*).

Figure 5A:
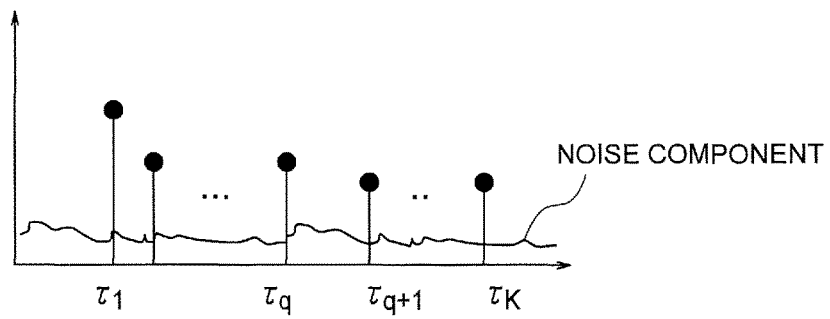
FIG. 5(a) is a diagram showing an example of a delay profile before the removal of the delayed waves by the delayed wave removal unit in FIG. 1, and FIG. 5(b) and FIG. 5(c) are diagrams showing different examples of the delay profiles after the removal.
Figure 5B:
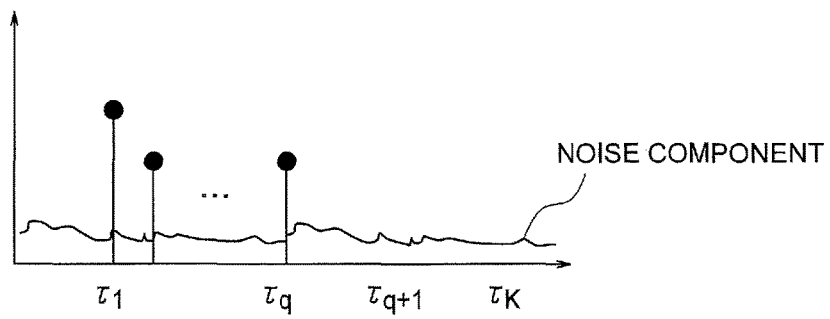
Figure 5C:
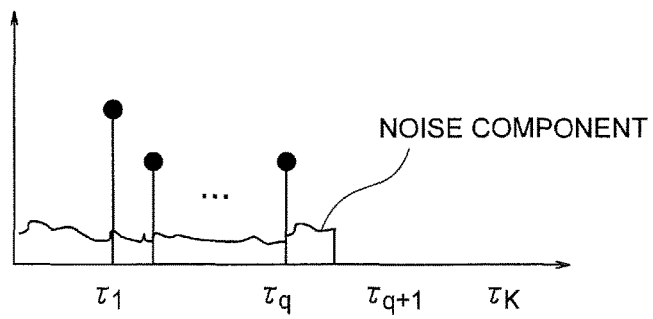

The delayed wave component removal unit 51-n substitutes 0's for the components corresponding to the delay time estimated values $\tau(\text{hat})_{q+1}, \ldots, \tau(\text{hat})_K$ in the delay profile (FIG. 5(*a*)) determined by the IFFT unit 50-n. As a result of this process, a delay profile (post-removal delay profile) which does not include the components corresponding to $\tau(\text{hat})_{q+1}, \ldots, \tau(\text{hat})_K$, and includes the components corresponding to $\tau(\text{hat})_1, \ldots, \tau(\text{hat})_q$, as shown in FIG. 5(*b*), is generated.

The FFT unit 52-n performs FFT on the output (FIG. 5(*b*)) of the delayed wave component removal unit 51-n, to restore a signal in the frequency domain. As a result of these processes, a transmission channel frequency characteristic which does not include the arriving wave components corresponding to $\tau(\text{hat})_{q+1}, \ldots, \tau(\text{hat})_K$, and which includes the arriving wave components corresponding to $\tau(\text{hat})_1, \ldots, \tau(\text{hat})_q$ is obtained.

Incidentally, the delayed wave component removal unit 51-n may substitute 0's for all the components in the range of $\tau(\text{hat})_{q+1}, \ldots, \tau(\text{hat})_K$ in the delay profile. A result of this process is shown in FIG. 5(*c*). In the example shown in FIG. 5(*c*), not only the components corresponding to $\tau(\text{hat})_{q+1}, \ldots, \tau(\text{hat})_K$, in the delay profile in FIG. 5(*a*), but also the noise components in the range of these components have been replaced with 0's.

The input signal and the output signal of the delayed wave removal unit 15-n can be represented by matrixes. First, the input signal, which is represented by the above equation (1), can also be represented by the following equation (2).

[Mathematical Expression 2]

$$z_n = X \cdot y_n \tag{2}$$

In the equation (2), X denotes a matrix representing the delay times, and can be represented by the following equation (3).

[Mathematical Expression 3]

$$X = \begin{bmatrix} \exp(-j2\pi f_1 \tau_1) & \ldots & \exp(-j2\pi f_1 \tau_k) & \ldots & \exp(-j2\pi f_1 \tau_K) \\ \exp(-j2\pi f_2 \tau_1) & \ldots & \exp(-j2\pi f_2 \tau_k) & \ldots & \exp(-j2\pi f_2 \tau_K) \\ \vdots & & \vdots & & \vdots \\ \exp(-j2\pi f_M \tau_1) & \ldots & \exp(-j2\pi f_M \tau_k) & \ldots & \exp(-j2\pi f_M \tau_K) \end{bmatrix} \tag{3}$$

In the equation (3), K denotes the number of the arriving waves as mentioned above, and M denotes the frequency division number as mentioned above.

The distance between the antenna element 10-1 and the antenna element 10-2 is in the order of half the wavelength, so that it is assumed that there is no difference in the delay time between the antenna elements.

$y_n$ in the equation (2) denotes a column vector consisting of components representing the amplitude and the phase of each of all the arriving waves (first to K-th arriving waves), and can be represented by the following equation (4).

[Mathematical Expression 4]

$$y_n = \begin{bmatrix} a_{n,1} \\ a_{n,2} \\ \vdots \\ a_{n,K} \end{bmatrix} \tag{4}$$

In the equation (4), $a_{n,k}$ (n=1, 2; k=1, ..., K) denotes a complex number representing the amplitude and phase of the k-th arriving wave of the signal received by the n-th antenna element 10-n.

Next, the output signal of the delayed wave removal unit 15-n is explained. If the estimated values of the delay times which the delay time grouping unit 14 has determined to be equal to or longer than the threshold value $\tau_{th}$ to are equal to the actual delay times, such delayed wave components are removed by the delayed wave removal unit 15-n. The output of the delayed wave removal unit 15-n is represented by the following equation (5).

[Mathematical Expression 5]

$$z'_n = X' \cdot y'_n \quad (5)$$

In the equation (5), X' denotes what is obtained by removing the components corresponding to the delay times $\tau_{q+1}, \ldots, \tau_K$ from X, and is represented by the equation (6).

[Mathematical Expression 6]

$$X' = \begin{bmatrix} \exp(-j2\pi f_1 \tau_1) & \ldots & \exp(-j2\pi f_1 \tau_q) \\ \exp(-j2\pi f_2 \tau_1) & \ldots & \exp(-j2\pi f_2 \tau_q) \\ \vdots & & \vdots \\ \exp(-j2\pi f_M \tau_1) & \ldots & \exp(-j2\pi f_M \tau_q) \end{bmatrix} \quad (6)$$

In the equation (5), $y'_n$ denotes what is obtained by removing the components corresponding to the delay times $\tau_{q+1}$, see, from $y_n$, and is represented by the equation (7).

[Mathematical Expression 7]

$$y'_n = \begin{bmatrix} a_{n,1} \\ a_{n,2} \\ \vdots \\ a_{n,q} \end{bmatrix} \quad (7)$$

If the equation (2) (together with the equations (3) and (4)) is compared with the equation (5) (together with the equations (6) and (7)), it will be observed that the output of the delayed wave removal unit 15-n is a transmission channel frequency characteristic pertaining to the arriving waves of the delay times $\tau(\text{hat})_1, \ldots, \tau(\text{hat})_q$, which the delay time grouping unit 14 has determined to be shorter than the threshold value $\tau_{th}$, and the size of the matrix X representing the delay times is reduced from M×K to M×q.

The pseudo-inverse matrix generation unit 16 calculates a matrix represented by the following equation (8), from the delay times $\tau(\text{hat})_1, \ldots, \tau(\text{hat})_q$ which the delay time grouping unit 14 has determined to be shorter than the threshold value $\tau_{th}$. X(hat)$^+$ represented by the equation (8) is called a pseudo-inverse matrix of X(hat)'.

[Mathematical Expression 8]

$$\hat{X}^+ = (\hat{X}'^H \hat{X}')^{-1} \hat{X}'^H \quad (8)$$

In the equation (8), X(hat)' denotes a matrix of the estimated values of the delay times which the delay time grouping unit 14 has determined to be shorter than the threshold value $\tau_{th}$, and is represented by the following equation (9).

The superscript "H" denotes a complex conjugate transpose, and the superscript "−1" denotes an inverse matrix.

[Mathematical Expression 9]

$$\hat{X}' = \begin{bmatrix} \exp(-j2\pi f_1 \hat{\tau}_1) & \ldots & \exp(-j2\pi f_1 \hat{\tau}_q) \\ \exp(-j2\pi f_2 \hat{\tau}_1) & \ldots & \exp(-j2\pi f_2 \hat{\tau}_q) \\ \vdots & & \vdots \\ \exp(-j2\pi f_M \hat{\tau}_1) & \ldots & \exp(-j2\pi f_M \hat{\tau}_q) \end{bmatrix} \quad (9)$$

The matrix represented by the equation (9) is generated based on the delay times $\tau(\text{hat})_1, \ldots, \tau(\text{hat})_q$ which the delay time grouping unit 14 has determined to be shorter than the threshold value $\tau_{th}$, and the process of determining the pseudo-inverse matrix in the equation (8) is performed using the matrix of the equation (9).

In the equation (8), the size of the matrix X(hat)'$^H$X(hat)' on which the inverse matrix computation is performed is q×q. In contrast, when a similar calculation is performed using X in the equation (3), the size of the matrix on which the inverse matrix computation is performed is K×K. Thus it will be understood that the size of the matrix is reduced as a result of the delayed wave removal.

The arriving wave separation units 17-1, 17-2 are provided respectively corresponding to the delayed wave removal units 15-1, 15-2, and each separate, from each other, arriving wave components included in the output of the corresponding delayed wave removal unit, to extract the direct wave component. Specifically, each arriving wave separation unit 17-n multiplies the output $z'_n$ (equation (5)) of the corresponding delayed wave removal unit 15-n, by the pseudo-inverse matrix X(hat)$^+$ (equation (8)) generated by the pseudo-inverse matrix generation unit 16, and extracts the direct wave component from the multiplication result. The above multiplication is represented by the following equation (10).

[Mathematical Expression 10]

$$\hat{y}'_n = \hat{X}^+ \cdot z'_n \quad (10)$$

y(hat)$'_n$ in the equation (10) is the result of estimation of $y'_n$ in the equation (7), and denotes a column vector represented by the following equation (11).

[Mathematical Expression 11]

$$\hat{y}'_n = \begin{bmatrix} \hat{a}_{n,1} \\ \hat{a}_{n,2} \\ \vdots \\ \hat{a}_{n,q} \end{bmatrix} \quad (11)$$

As a result of the computation of the equation (10), complex numbers representing the amplitude and the phase of the arriving wave components (first to q-th arriving wave components) of the delay times which the delay time grouping unit 14 has determined to be shorter than the threshold value $\tau_{th}$ are obtained.

From the equations (5) to (11), it will be understood that if the estimation results of the delay times are equal to the actual delay times, y(hat)$'_n$ will be equal to $y'_n$.

The arriving wave separation unit 17-n also extracts the value a(hat)$_{n,1}$ at the top of the above-mentioned column vector y(hat)$'_n$, and outputs it as the direct wave component.

The arrival angle estimation unit 18 calculates the phase difference between the direct wave component a(hat)$_{1,1}$ extracted by the arriving wave separation unit 17-1, and the direct wave component a(hat)$_{2,1}$ extracted by the arriving wave separation unit 17-2, and estimates the arrival direction of the direct wave based on the calculated phase difference. The arrival direction of the direct wave is determined to be the direction of the transmitter.

Figure 6:
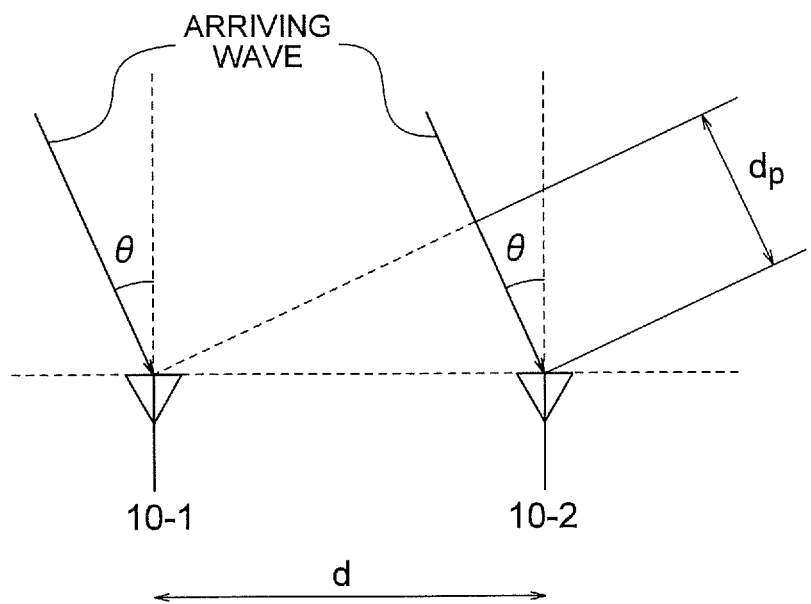
FIG. 6 is a diagram schematically illustrating the arrival angle of the direct wave.

As shown in FIG. 6, if the distance between the antenna elements is d[m], the wavelength of the carrier is λ[m], and the arrival angle θ of the direct wave, there is a relation:

$$d_p = \lambda \times \sin\theta$$

between the propagation path difference d$_p$ between the antenna elements, and the arrival angle θ, and there is a relation:

$$d_p = \lambda \times \varphi / 2\pi$$

between the propagation path difference d$_p$, the wave length λ, and the phase difference φ of the received radio waves.

Accordingly, there is a relation of the following equation (12):

[Mathematical Expression 12]

$$\phi = 2\pi \cdot (d/\lambda) \cdot \sin\theta \quad (12)$$

between the arrival angle θ and the phase difference φ.

The equation (12) can be rewritten as the equation (13).

[Mathematical Expression 13]

$$\theta = \arcsin\left(\frac{\phi}{2\pi \cdot (d/\lambda)}\right) \quad (13)$$

In the equation (13), the inter-antenna element distance d and the wavelength λ are known. Accordingly, it will be understood that θ can therefore be determined uniquely from φ.

Figure 7:
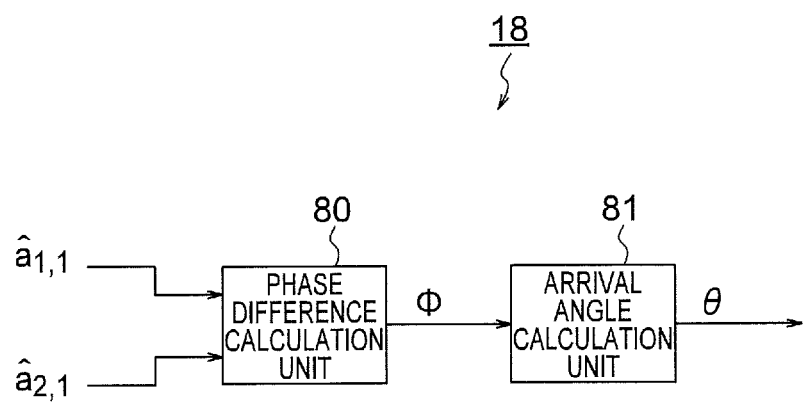
FIG. 7 is a block diagram showing an example of a configuration of the arrival angle estimation unit in FIG. 1.

To perform the above processes, the arrival angle estimation unit 18 comprises a phase difference calculation unit 80, and an arrival angle calculation unit 81, as shown in FIG. 7.

The phase difference calculation unit 80 calculates the phase difference φ between the direct wave component a(hat)$_{1,1}$ and the direct wave component a(hat)$_{2,1}$.

If the argument of the direct wave component a(hat)$_{1,1}$ is ψ$_1$, and the argument of the direct wave component a(hat)$_{2,1}$ is ψ$_2$, the phase difference φ is determined by the following equation (14).

[Mathematical Expression 14]

$$\phi = \psi_2 - \psi_1 \quad (14)$$

The arrival angle calculation unit 81 determines the arrival angle θ from the phase difference φ, using the relation of the above equation (13).

In the above embodiment, the number of the antenna elements is two. But the invention is applicable to a case where the number of the antenna elements is more than two. In such a case, the phase difference between the antenna elements is determined for each of a plurality of combination patterns, and an average value of the arrival angles for the respective combinations may be calculated.

As has been described, according to the technique shown in Patent Reference 1, the direct wave and the delayed waves cannot be separated when there are delayed waves of short delay times, and the accuracy of estimation of the arrival angle of the direct wave is lowered. In contrast, according to the present embodiment, the direct wave and the delayed waves are separated after estimating the delay times of the arriving waves by a super-resolution process, with the result that the arrival angle of the direct wave can be estimated with a high accuracy even if there are delayed waves of short delay times.

Also, the arriving waves are separated after removing the delayed wave components of long delay times, from the transmission channel estimation result, so that the amount of calculation required to determine the inverse matrix, which is necessary at the time of the arriving wave separation can be reduced. Specifically, if the delayed wave components are not removed, the number of multiplications required is K$^3$, whereas if the delayed waves are removed, the number of multiplications is q$^3$. Because q<K, it will be understood that the amount of calculation required for the inverse matrix computation is reduced. Although the delayed wave removal unit 15-n performs the processes of FFT and IFFT of M points for the removal of the delayed waves, the number of multiplications required for the FFT or IFFT is M×log (M), and does not depend on the number of the arriving waves, so that the amount of calculation is constant. Thus, it can be said that the effect of reducing the amount of calculation is greater in an environment in which the number of the arriving waves is large.

Second Embodiment

Figure 8:
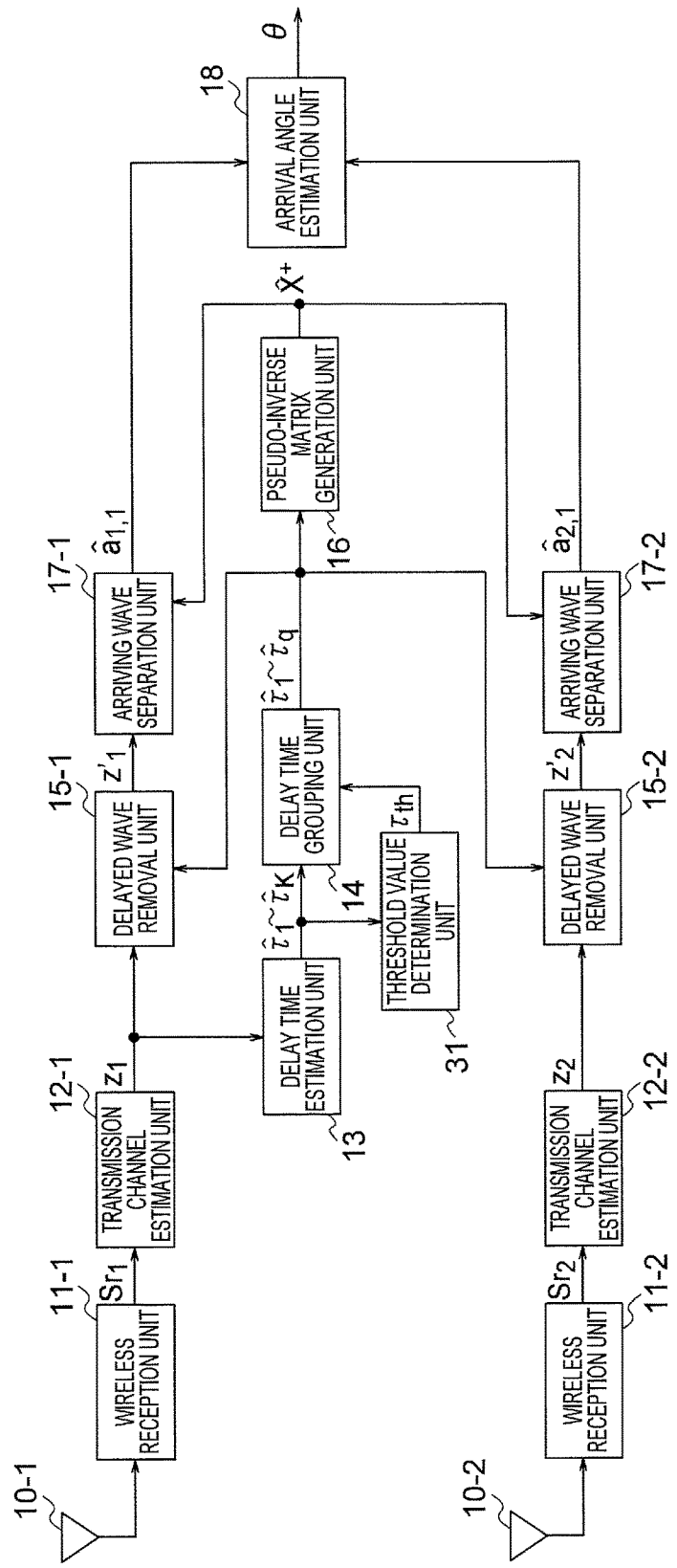
FIG. 8 is a block diagram showing a receiving apparatus of a second embodiment of the present invention.

FIG. 8 shows a receiving apparatus of the second embodiment of the present invention. The receiving apparatus shown in FIG. 8 is generally identical to the receiving apparatus in FIG. 1, but a threshold value determination unit 31 is added.

The threshold value determination unit 31 determines the threshold value τ$_{th}$ based on the delay times estimated by the delay time estimation unit 13.

The delay time grouping unit 14 in FIG. 8 is generally identical to the delay time grouping unit 14 in FIG. 1, but differs in the following respects. That is, the delay time grouping unit 14 in FIG. 1 uses the predetermined threshold value τ$_{th}$, whereas the delay time grouping unit 14 in FIG. 8 uses the threshold value τ$_{th}$ determined by the threshold value determination unit 31.

For example, the threshold value determination unit 31 uses an intermediate value between the minimum value and the maximum value of the delay times estimated by the delay time estimation unit 13 as the threshold value τ$_{th}$.

Alternatively, a sum of the minimum value of the delay times estimated by the delay time estimation unit 13 and a predetermined value may be used as the threshold value τ$_{th}$.

Still alternatively, a sum of a product of the difference between the maximum value and the minimum value of the delay times estimated by the delay time estimation unit 13, and a predetermined value larger than 0 and smaller than 1, and the above-mentioned minimum value may be used as the threshold value τ$_{th}$.

The threshold value τ$_{th}$ may be any value provided that it is longer than the minimum value and shorter than the maximum value of the delay times estimated by the delay time estimation unit 13, and, with regard to the manner of its calculation, the present embodiment is not limited to those explained above.

By dynamically determining the threshold value used for grouping the delay times, as described above, even in an environment in which the delay times of the delay waves vary with time, the delay times can be grouped into those which are shorter than the threshold value $\tau_{th}$ and those which are equal to or longer than the threshold value $\tau_{th}$, and, therefore, part only of the arriving waves estimated in the transmission channel estimation units 12-1, 12-2 can be removed.

Third Embodiment

Figure 9:
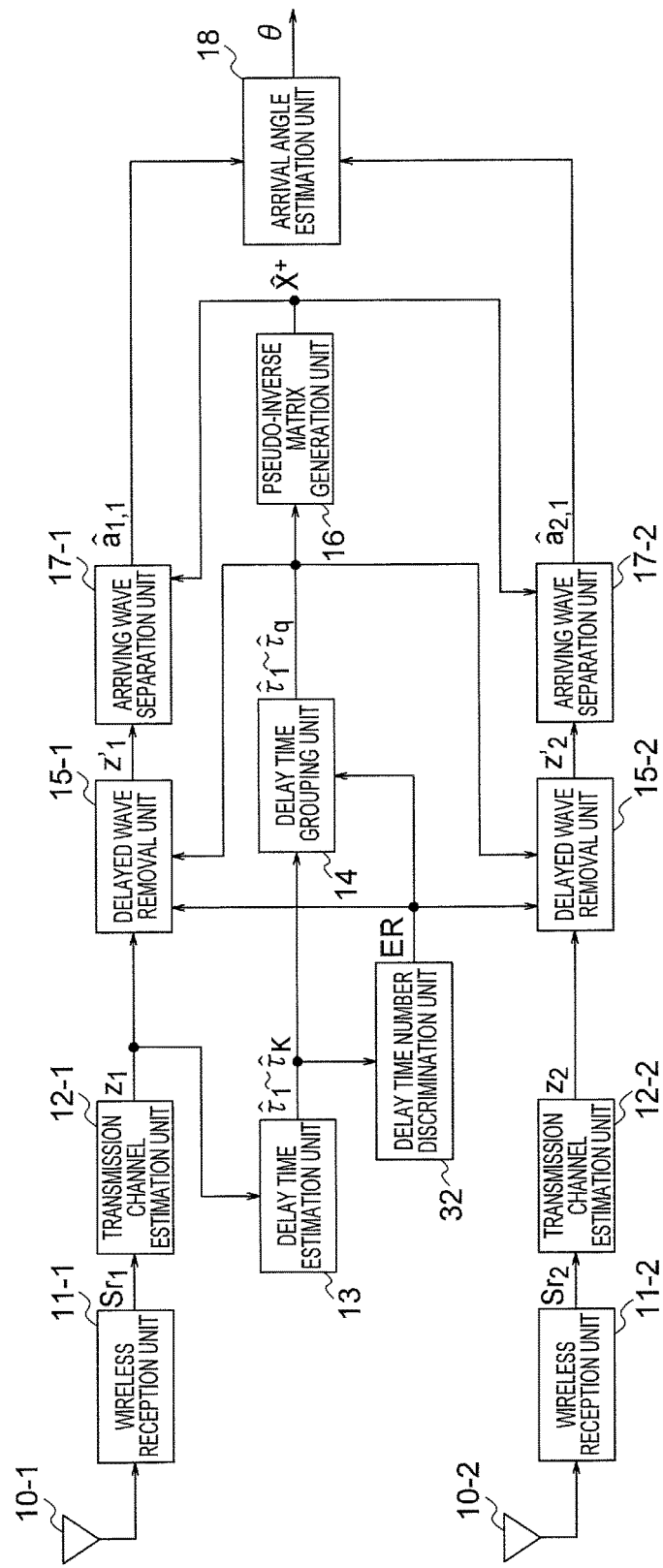
FIG. 9 is a block diagram showing a receiving apparatus of a third embodiment of the present invention.

FIG. 9 shows a receiving apparatus of the third embodiment of the present invention. The receiving apparatus shown in FIG. 9 is generally identical to the receiving apparatus in FIG. 1, but a delay time number discrimination unit 32 is added.

The delay time number discrimination unit 32 determines whether the number K of the delay times (corresponding to the number of the arriving waves), estimated by the delay time estimation unit 13 is smaller than a predetermined threshold value $K_{th}$, and outputs the result ER of the determination.

The delay time grouping unit 14, and the delayed wave removal units 15-1, 15-2 in FIG. 9 are generally identical to the delay time grouping unit 14, and the delayed wave removal units 15-1, 15-2 in FIG. 1, respectively, but differ in the following respects.

The delay time grouping unit 14 in FIG. 9 determines whether to carry out the process of the delay time grouping based on the result ER of the determination by the delay time number discrimination unit 32.

Also, the delayed wave removal units 15-1, 15-2 in FIG. 9 determine whether to carry out the process of the delayed wave removal based on the result of the determination by the delay time number discrimination unit 32.

Specifically, if the result of the determination by the delay time number discrimination unit 32 indicates that the number K of the delay times is smaller than the threshold value $K_{th}$, the delay time grouping unit 14 does not carry out the process of the delay time grouping, and outputs all the delay times $\tau_1$ to $\tau_K$ estimated by the delay time estimation unit 13.

As a result, the pseudo-inverse matrix generation unit 16 generates the pseudo-inverse matrix X(hat)$^+$ of the equation (8) based on all the delay times $\tau_1$ to $\tau_K$ (that is, by putting q=K in the equation (9)).

Also, if the result of the determination output from the delay time number discrimination unit 32 indicates that the number K of the delay times is smaller than the threshold value $K_{th}$, the delayed wave removal units 15-1, 15-2 do not carry out the processes of the delayed wave removal, and pass on the output $z_n$ of the transmission channel estimation units 12-1, 12-2 without alteration.

As a result, the arriving wave separation unit 17-$n$ multiplies the output $z_n$ of the transmission channel estimation unit 12-$n$ by the pseudo-inverse matrix (equation (8)) in a manner similar to that indicated by the equation (10), to obtain the column vector (equation (11)). That is, $z_n$ is used as $z_n'$ in the multiplication in the equation (10), and a column vector y(hat)$'_n$ represented by the equation (11) with the exception of q=K is obtained. Such a column vector y(hat)$'_n$ comprises the components corresponding to all the delay times $\tau_1$ to $\tau_K$.

If the result of the determination by the delay time number discrimination unit 32 indicates that the number K of the delay times is equal to or larger than the predetermined number $K_{th}$, the delay time grouping unit 14 carries out the delay time grouping in the same manner as in the first embodiment, and the delayed wave removal units 15-1, 15-2 carry out the delayed wave removal in the same manner as in the first embodiment.

As was described above, the number of the delay times corresponds to the number of arriving waves. When the number of the arriving waves is small, and the effect of reducing the amount of calculation for the delay time grouping and the delayed wave removal is limited, the amount of processes can be reduced by not carrying out the delay time grouping and the delayed wave removal.

The third embodiment has been described as a modification to the first embodiment. Similar modification can be applied to the second embodiment.

Description has been made of the receiving apparatuses according to the present invention. Receiving methods implemented in the above-described receiving apparatuses also form a part of the present invention.

Next, receiving methods respectively corresponding to the first to third embodiments will be described as fourth to sixth embodiments.

Fourth Embodiment

The fourth embodiment is a receiving method corresponding to the first embodiment.

Figure 10:
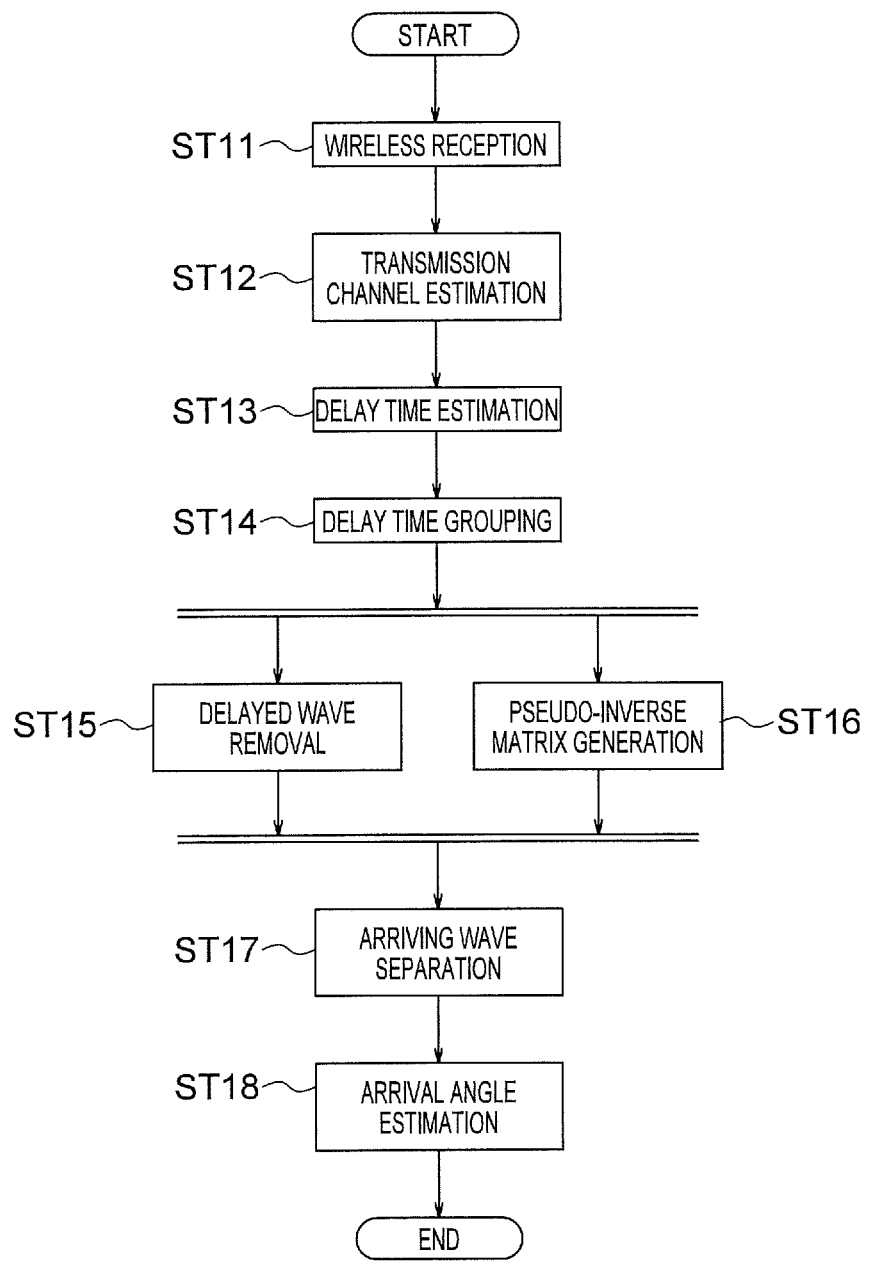
FIG. 10 is a flowchart showing the procedure of the processes in a receiving method of a fourth embodiment of the present invention.

FIG. 10 shows a process procedure in the present embodiment.

The receiving method shown in FIG. 10 comprises a wireless reception step ST11, a transmission channel estimation step ST12, a delay time estimation step ST13, a delay time grouping step ST14, a delayed wave removal step ST15, a pseudo-inverse matrix generation step ST16, an arriving wave separation step ST17, and an arrival angle estimation step ST18.

The processes in the wireless reception step ST11 are similar to the processes performed by the wireless reception units 11-1 and 11-2 in FIG. 1. The processes in the transmission channel estimation step ST12 are similar to the processes performed by the transmission channel estimation units 12-1 and 12-2 in FIG. 1. The processes in the delay time estimation step ST13 are similar to the processes performed by the delay time estimation unit 13 in FIG. 1. The processes in the delay time grouping step ST14 are similar to the processes performed by the delay time grouping unit 14 in FIG. 1. The processes in the delayed wave removal step ST15 are similar to the processes performed by the delayed wave removal units 15-1 and 15-2 in FIG. 1. The processes in the pseudo-inverse matrix generation step ST16 are similar to the processes performed by the pseudo-inverse matrix generation unit 16 in FIG. 1. The processes in the arriving wave separation step ST17 are similar to the processes performed by the arriving wave separation units 17-1 and 17-2 in FIG. 1. The processes in the arrival angle estimation step ST18 are similar to the processes performed by the arrival angle estimation unit 18 in FIG. 1.

In the wireless reception step ST11, first and second analog signals obtained by receiving radio waves by two antenna elements 10-1, 10-2 are respectively frequency-converted into baseband signals, and then AD converted to generate first and second digital signals $Sr_1$, $Sr_2$.

In the transmission channel estimation step ST12, transmission channel frequency characteristics are estimated, respectively from the first and second digital signals $Sr_1$, $Sr_2$ generated in the wireless reception step ST11, and first and second transmission channel estimation results $z_1$, $z_2$ are output.

The method of estimating the transmission channel frequency characteristics depends on the transmission scheme adopted in the communication system. The present invention is applicable to any transmission scheme. However, the following description relates to a case in which the OFDM (Orthogonal Frequency Division Multiplex) transmission scheme, and a case in which the DSSS (Direct Sequence Spectrum Spread) transmission scheme is adopted. The OFDM transmission scheme and the DSSS transmission scheme are adopted in many communication systems.

First, a case in which the OFDM transmission scheme is adopted is described. In the OFDM transmission scheme, symbols are generated by multiplexing a plurality of subcarriers which are orthogonal to each other, and transmission is performed symbol by symbol. In many of the communication systems in which the OFDM transmission scheme is adopted, part of the subcarriers are used as pilot subcarriers which are known at the transmission side and the reception side, in order to compensate for the transmission channel distortion at the reception side. In the present embodiment, the pilot subcarriers are used to estimate the transmission channel frequency characteristics.

Figure 11:
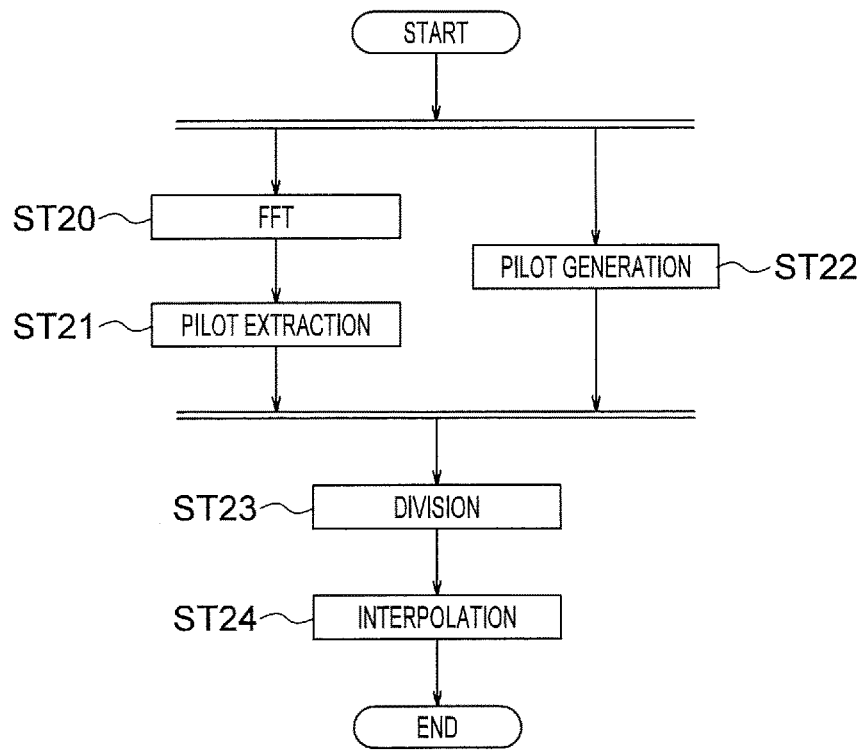
FIG. 11 is a flowchart showing the procedure of the processes in an example of the transmission channel estimation step in FIG. 10.

FIG. 11 shows a procedure of processes in an example of the transmission channel estimation step ST12 performed in a case in which the OFDM transmission scheme is adopted.

The transmission channel estimation step ST12 shown in FIG. 11 comprises an FFT step ST20, a pilot extraction step ST21, a pilot generation step ST22, a division step ST23, and an interpolation step ST24.

In the FFT step ST20, the digital signals $Sr_1$, $Sr_2$ generated in the wireless reception step ST11 in FIG. 10 are converted from the time axis into the frequency axis by FFT (Fast-Fourier Transform), symbol by symbol, to output respective subcarriers.

In the pilot extraction step ST21, the pilot carriers are extracted from the subcarriers output in the FFT step ST20.

The processes in the step ST22 are performed in parallel with the processes in the steps ST20 and ST21.

In the pilot generation step ST22, pilot carriers known at the reception side are generated.

After the step ST21 and the step ST22, the processes in the step ST23 are performed.

In the division step ST23, the pilot carriers extracted in the pilot extraction step ST21 are divided by the pilot carriers generated in the pilot generation step ST22, to output the frequency characteristics acting on the transmission channel for the pilot carriers.

In the interpolation step ST24, interpolation is performed using the frequency characteristics of the transmission channel acting on the pilot carriers in the symbol direction and in the subcarrier direction, to obtain the frequency characteristics of the transmission channel (transmission channel estimation results) for all the subcarriers.

Next, a case in which the DSSS transmission scheme is adopted is described. In the DSSS transmission scheme, signals spread by using a pseudonoise sequence symbol by symbol are transmitted, and despread at the reception side.

Figure 12:
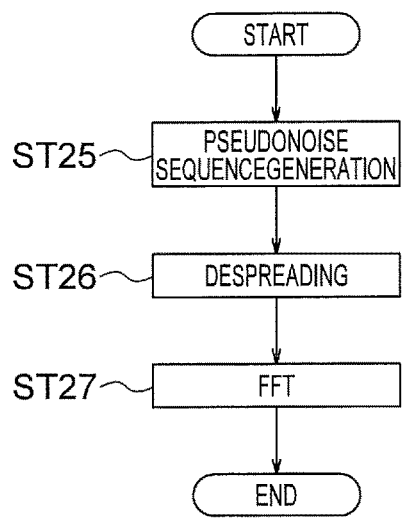
FIG. 12 is a flowchart showing the procedure of the processes in another example of the transmission channel estimation step in FIG. 10.

FIG. 12 shows a procedure of processes in an example of the transmission channel estimation step ST12 performed when the DSSS transmission scheme is adopted.

The transmission channel estimation step ST12 shown in FIG. 12 comprises a pseudonoise sequence generation step ST25, a despreading step ST26, and an FFT step ST27.

In the pseudonoise sequence generation step ST25, a pseudonoise sequence Ns which is identical to the pseudonoise sequence used at the time of spreading at the transmission side is generated.

In the despreading step ST26, sliding correlations between the digital signals $Sr_1$, $Sr_2$ generated in the wireless reception step ST11 in FIG. 10 and the pseudonoise sequence Ns are calculated, symbol by symbol.

In the FFT step ST27, the results of the calculation in the despreading step ST26 are transformed into the frequency domain by FFT, to obtain the transmission channel frequency characteristics (transmission channel estimation results).

The first and second transmission channel estimation results $z_1$, $z_2$ calculated in the transmission channel estimation step ST12 are represented by what are obtained by putting n=1 or 2 in the equation (1).

Returning to FIG. 10, in the delay time estimation step ST13, based on either of the first and second transmission channel estimation results $z_1$, $z_2$, for example, the first transmission channel estimation result $z_1$, the delay times of one or more arriving waves included in the radio waves received by the corresponding antenna are estimated.

The delay time estimation is performed by a super-resolution process, such as the MUSIC process, or the ESPRIT process. Here, the number of the arriving waves is denoted by K, the delay times of the respective arriving waves are denoted by $\tau_1, \tau_2, \ldots, \tau_K$, the estimated values of the delay times are denoted by $\tau(hat)_1, \tau(hat)_2, \ldots, \tau(hat)_K$. Here, it is assumed that $\tau_1 < \tau_2 < \ldots \tau_K$.

In the delay time grouping step ST14, the delay time estimation results $\tau(hat)_1, \tau(hat)_2, \ldots, \tau(hat)_K$ are compared with a predetermined threshold value $\tau_{th}$, and determination is made as to whether each estimated value $\tau(hat)_k$ is shorter than the threshold value $\tau_{th}$. Then, the estimated values $\tau(hat)_1, \ldots, \tau(hat)_K$ are grouped into those $\tau(hat)_1, \ldots, \tau(hat)_q$ shorter than the threshold value $\tau_{th}$, and other estimated values $\tau(hat)_{q+1}, \ldots, \tau(hat)_K$ (those equal to or longer than the threshold value $\tau_{th}$). Here, it is assumed that the threshold value $\tau_{th}$ is so determined as to satisfy the relation: $\tau(hat)_1 < \tau_{th} < \tau(hat)_K$.

In the delayed wave removal step ST15, from each of the results of the estimation of the transmission channel frequency characteristic in the transmission channel estimation step ST12, the delayed wave components corresponding to the delay times $\tau(hat)_{q+1}, \ldots, \tau(hat)_K$ which have been determined to be equal to or longer than the threshold value $\tau_{th}$ in the delay time grouping step ST14 are removed, and the first and second transmission channel frequency characteristics $z'_1$, $z'_2$ consisting of the arriving wave components which have not been removed are output.

Figure 13:
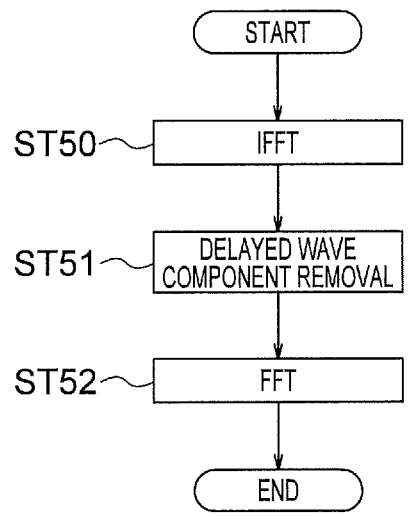
FIG. 13 is a flowchart showing the procedure of the processes in an example of the delayed wave removal step in FIG. 10.

FIG. 13 shows a process procedure in an example of the delayed wave removal step ST15.

The delayed wave removal step ST15 shown in FIG. 13 comprises an IFFT step ST50, a delayed wave component removal step ST51, and an FFT step ST52.

In the IFFT step ST50, IFFT is performed on the estimation result $z_n$ of the transmission channel frequency characteristic shown in the equation (1), to obtain the delay profile, shown for example in FIG. 5(a).

In the delayed wave component removal step ST51, the components corresponding to the delay time estimated values $\tau(hat)_{q+1}, \ldots, \tau(hat)_K$ in the delay profile obtained in the IFFT step ST50 are replaced with 0's, as shown in FIG. 5(b). As a result, a delay profile (post-removal delay profile) which does not include the components corresponding to $\tau(hat)_{q+1}, \ldots, \tau(hat)_K$, and includes the components corresponding to $\tau(hat)_1, \ldots, \tau(hat)_q$ is generated.

In the FFT step ST52, FFT is performed on the output of the delayed wave component removal step ST51, so as to restore a signal in the frequency domain. As a result of these processes, a transmission channel frequency characteristic which does not include the arriving wave components corresponding to $\tau(\text{hat})_{q+1}, \ldots, \tau(\text{hat})_K$, and includes the arriving wave components corresponding to $\tau(\text{hat})_1, \ldots, \tau(\text{hat})_q$ is obtained.

In the above-described delayed wave component removal step ST51, all the components in the range of $\tau(\text{hat})_{q+1}, \ldots, \tau(\text{hat})_K$ in the delay profile in FIG. 5(*a*) may be replaced with 0's, as shown in FIG. 5(*c*).

The processes in the delayed wave removal step ST15 are performed on the signals $z_1$, $z_2$ (obtained by putting n=1 or 2 in the equation (2)), and signals $z'_1$, $z'_2$ (obtained by putting n=1 or 2 in the equation (5)) are generated as a result of the processes.

If the equation (2) and the equation (5) are compared, it will be understood that the signals generated as a result of the processes of the delayed wave removal step ST15 represent the transmission channel frequency characteristic pertaining to the delay times $\tau(\text{hat})_1, \ldots, \tau(\text{hat})_q$ which have been determined to be shorter than the threshold value $\tau_{th}$ in the delay time grouping step ST14, and that the size of the matrix X representing the delay times is reduced from M×K to M×q.

In parallel with the processes in the delayed wave removal step ST15, the processes of the pseudo-inverse matrix generation step ST16 are performed.

In the pseudo-inverse matrix generation step ST16, the pseudo-inverse matrix $X(\text{hat})^+$ represented by the above-mentioned equation (8) is calculated based on the delay times which have been determined to be shorter than the threshold value $\tau_{th}$ in the delay time grouping step ST14.

It will be understood that the size of the matrix $X(\text{hat})'^H X(\text{hat})'$ in the equation (8) on which the inverse matrix computation is performed is q×q, and that the size of the matrix is reduced by the delayed wave removal step ST15.

After the delayed wave removal step ST15 and the pseudo-inverse matrix generation step ST16, the processes of the arriving wave separation step ST17 are performed.

In the arriving wave separation step ST17, each of the first and second transmission channel frequency characteristics $z'_1$, $z'_2$ (obtained by putting n=1 or 2 in the equation (5)) which are generated in the delayed wave removal step ST15 is multiplied by the pseudo-inverse matrix $X(\text{hat})+$ generated in the pseudo-inverse matrix generation step ST16, so that the arriving wave components included in the first and second transmission channel frequency characteristics $z'_1$, $z'_2$ are separated from each other and the first and second direct wave components are extracted.

The above-mentioned multiplication is represented by the above-mentioned equation (10).

As a result of the multiplication, column vectors $y(\text{hat})'_1$ and $y(\text{hat})'_2$ (obtained by putting n to be 1 or 2 in the equation (11)).

In the arriving wave separation step ST17, the values $a(\text{hat})_{1,1}$, $a(\text{hat})_{2,1}$ at the top are extracted from the respective column vectors $y(\text{hat})'_1$, $y(\text{hat})'_2$ calculated in the manner described above, and output as the first and second direct wave components.

In the arrival angle estimation step ST18, the phase difference $\phi$ between the first direct wave component $a(\text{hat})_{1,1}$ and the second direct wave component $a(\text{hat})$ 2,1 extracted in the arriving wave separation step ST17 are calculated, and the arriving direction of the direct wave is estimated based on the calculated phase difference.

Figure 14:
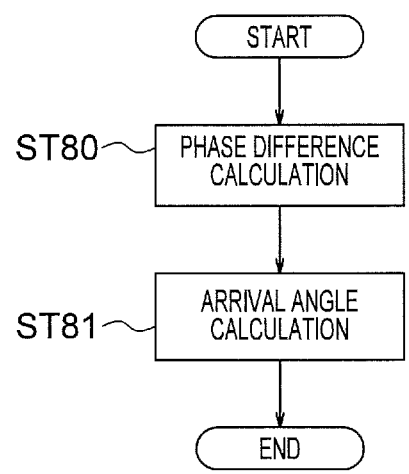
FIG. 14 is a flowchart showing the procedure of the processes in an example of the arrival angle estimation step in FIG. 10.

For example, the arrival angle estimation step ST18 comprises a phase difference calculation step ST80, and an arrival angle calculation step ST81, as shown in FIG. 14.

In the phase difference calculation step ST80, the phase difference $\phi$ between the direct wave component $a(\text{hat})_{1,1}$ and the direct wave component $a(\text{hat})_{2,1}$ is calculated. The calculation is performed according to the above equation (14).

In the arrival angle calculation step ST81, the arrival angle $\theta$ is calculated from the phase difference $\phi$ using the relation of the above equation (13).

By the fourth embodiments, effects similar to those obtained by the first embodiments are obtained.

Fifth Embodiment

The fifth embodiment is a receiving method corresponding to the second embodiment.

Figure 15:
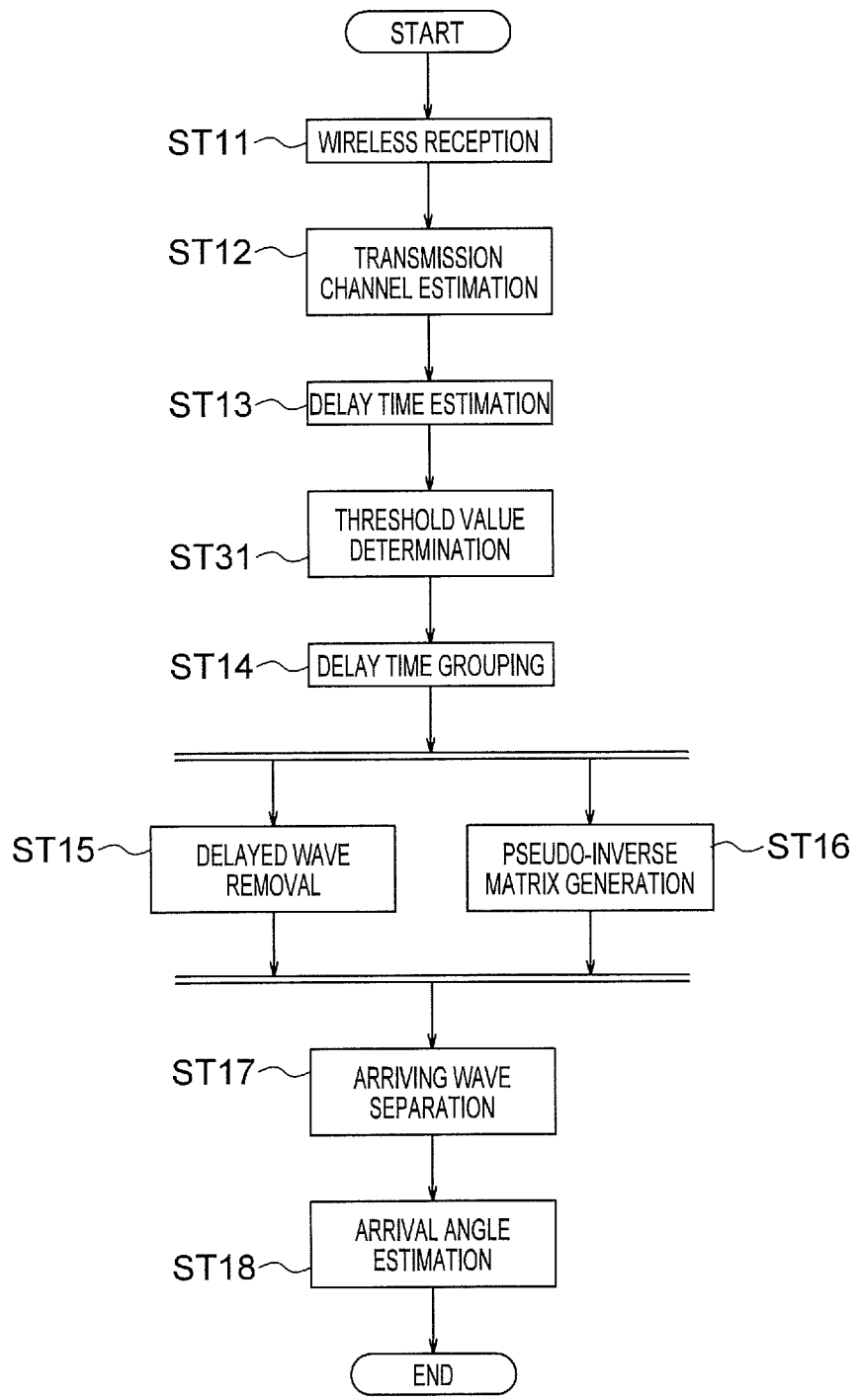
FIG. 15 is a flowchart showing the procedure of the processes in a receiving method of a fifth embodiment of the present invention.

FIG. 15 shows a process procedure in the fifth embodiment of the present invention.

The receiving method shown in FIG. 15 is generally identical to the receiving method of FIG. 10, but a threshold value determination step ST31 is added.

The processes of the threshold value determination step ST31 are similar to the processes performed by the threshold value determination unit 31 in FIG. 8.

The processes of the threshold value determination step ST31 are performed after the processes of the delay time estimation step ST13.

In the threshold value determination step ST31, the threshold value $\tau_{th}$ is determined based on the delay times estimated in the delay time estimation step ST13.

The delay time grouping step ST14 in FIG. 15 is generally identical to the delay time grouping step ST14 in FIG. 10, but differs in the following respects.

That is, in the delay time grouping step ST14 in FIG. 10, the predetermined threshold value $\tau_{th}$ is used, whereas in the delay time grouping step ST14 in FIG. 15, the threshold value $\tau_{th}$ determined in the threshold value determination step ST31 is used.

In the threshold value determination step ST31, for example, an intermediate value between the minimum value and the maximum value of the delay times estimated in the delay time estimation step ST13 is used as the threshold value $\tau_{th}$.

Alternatively, a sum of the minimum value of the delay times estimated in the delay time estimation step ST13, and a predetermined value may be used as the threshold value $\tau_{th}$.

Still alternatively, a sum of the product of the difference between the maximum value and the minimum value of the delay times estimated in the delay time estimation step ST13, and a predetermined value larger than 0 and smaller than 1, and the above-mentioned minimum value may be used as the threshold value $\tau_{th}$.

The threshold value $\tau_{th}$ may be any value as long as it is between the minimum value and the maximum value of the delay times estimated by the delay time estimation step ST13, and, the present embodiment is not limited to the manner of its calculation.

By dynamically determining the threshold value used for grouping the delay times, as described above, even in an environment in which the delay times of the delay waves vary with time, the delay times can be grouped into those which are shorter than the threshold value $\tau_{th}$ and those which are equal to or longer than the threshold value $\tau_{th}$, and, therefore, part only of the arriving waves estimated in the transmission channel estimation step ST12 can be removed.

Sixth Embodiment

The sixth embodiment is a receiving method corresponding to the third embodiment.

Figure 16:
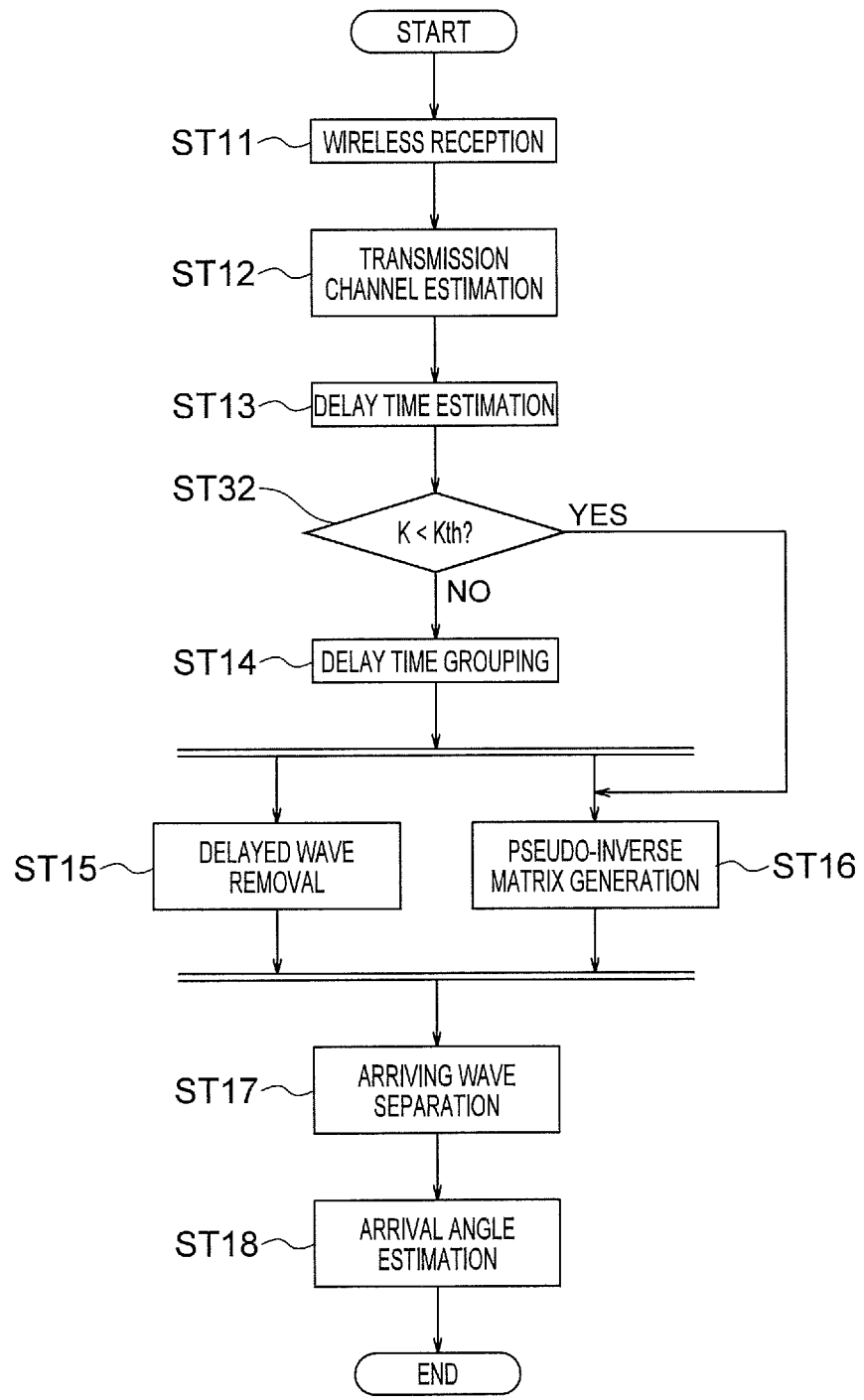
FIG. 16 is a flowchart showing the procedure of the processes in a receiving method of the sixth embodiment of the present invention.

FIG. 16 shows a process procedure in the sixth embodiment of the present invention. The receiving method shown in FIG. 16 is generally identical to the receiving method in FIG. 10, but a delay time number discrimination step ST32 is added.

The processes in the delay time number discrimination step ST32 are similar to the processes performed by the delay time number discrimination unit 32.

The delay time number discrimination step ST32 is performed after the delay time estimation step ST13.

In the delay time number discrimination step ST32, a determination is made as to whether the number K of the delay times (corresponding to the number of the arriving waves) estimated in the delay time estimation step ST13 is smaller than a predetermined threshold value $K_{th}$.

If, in the delay time number discrimination step ST32, the number K of the delay times (corresponding to the number of the arriving waves) estimated by the delay time estimation step ST13 is determined to be equal to or larger than the threshold value $K_{th}$ (in the case of NO in the step ST32), the procedure proceeds to the step ST14. Subsequent processes are similar to those described in the first embodiment.

If, in the delay time number discrimination step ST32, the number K of the delay times (corresponding to the number of the arriving waves) estimated in the delay time estimation step ST13 is determined to be smaller than the threshold value $K_{th}$ (in the case of YES in step ST32), the procedure proceeds to the step ST16.

As a result, in the pseudo-inverse matrix generation step ST16, the pseudo-inverse matrix $X(hat)^+$ of the equation (8) is generated based on all the delay times $\tau_1$ to $\tau_K$ estimated in the delay time estimation step ST13 (i.e., putting q=K in the equation (9)).

In the arriving wave separation step ST17, the first and second transmission channel estimation results $z_1$, $z_2$ (obtained by putting n=1 or 2 in the equation (2)) calculated in the transmission channel estimation step ST12 are multiplied by the pseudo-inverse matrix (equation (8)) generated in the pseudo-inverse matrix generation step ST16, as in the equation (10), to obtain the column vector (equation (11)). That is, in the multiplication of the equation (10), $z_n$ is used as $z_n'$, and as the column vector $y(hat)'_n$ the equation (11), one which results by putting q=K is obtained. Such a column vector $y(hat)'_n$ comprises the components corresponding to all the delay times $\tau_1$ to $\tau_K$.

As was described above, the number of the delay times corresponds to the number of the arriving waves. By not carrying out the delay time grouping and the delayed wave removal when the number of the arriving waves is small, and the effects of reducing the amount of calculation for the delay time grouping and the delayed wave removal is therefore limited, the amount of processing can be reduced.

The sixth embodiment has been described as a modification to the fourth embodiment. Similar modification can be applied to the fifth embodiment.

Also, modifications similar to those described in connection with the first to third embodiments may be applied to the fourth to sixth embodiments.

Seventh Embodiment

Various parts of the receiving apparatus according to the first, second and third embodiments, shown in FIG. 1, FIG. 8, and FIG. 9 (parts shown as functional blocks) may be implemented by a processing circuit. The processing circuit may be dedicated hardware or a CPU executing programs stored in a memory.

For example, the functions of respective parts in FIG. 1, FIG. 8, and FIG. 9 may be implemented by separate processing circuits, or the functions of a plurality of parts may be implemented by a single processing circuit.

When the processing circuit is a CPU, the functions of the various parts of the receiving apparatus may be implemented by software, firmware, or a combination of software and firmware. Software or firmware is described as programs, and stored in a memory. The processing circuit implements the functions of the various parts by reading and executing the programs stored in the memory. That is, when the receiving apparatus is implemented by a processing circuit, it comprises a memory for storing programs which, when executed, cause the functions of the various parts shown in FIG. 1, FIG. 8, or FIG. 9 to be performed. These programs can be said to those causing a computer to execute the processes or their procedure in the receiving method implemented in the receiving apparatus.

Also, part of the functions of the various parts of the receiving apparatus may be implemented by dedicated hardware and other part may be implemented by software or firmware.

Thus, the processing circuit may realize the various functions described above by hardware, software, firmware or their combination.

FIG. 17 shows an example of a configuration in which the above-mentioned processing circuit is a CPU, and all the functions of the receiving apparatus are implemented by a computer (denoted by reference characters 100) comprising a single CPU, together with antenna elements 10-1, 10-2.

The computer 100 shown in FIG. 17 comprises a CPU 101, a memory 102, input units 103-1, 103-2, and an output unit 104, which are interconnected by a bus 105.

Connected to the input units 103-1, 103-2 are antenna elements 10-1, 10-2.

Signals received by the antenna elements 10-1, 10-2 are supplied to the CPU 101 via the input units 103-1, 103-2.

The CPU 101 operates according to the programs stored in the memory 102, and performs the processes of the various parts of the receiving apparatus of the first, second or third embodiment, on the signals input via the input units 103-1, 103-2, and outputs the resultant output signals via the output unit 104.

The contents and the procedure of the processes by the CPU 101 are similar to those described in the first, second and third embodiments.

Description has been made on the cases in which the processes in the receiving apparatuses in the first, second and third embodiments are executed by a computer. It is also possible to have a computer execute the processes of various steps in the receiving methods in the fourth, fifth and sixth embodiments, in the manner similar to that described above.

Effects similar to those described in connection with the receiving apparatus can also be obtained from the receiving method implemented in the receiving apparatus, programs for causing a computer to execute the processes performed by the various parts of the receiving apparatus or the processes in the receiving method, and a computer-readable recording medium in which the above-mentioned programs are stored.

REFERENCE CHARACTERS 10-1, 2: antenna element; 11-1, 11-2: wireless reception unit; 12-1, 12-2: transmission channel estimation unit; 13: delay time estimation unit; 14: delay time grouping unit; 15-1, 15-2: delayed wave removal unit; 17-1, 17-2: arriving wave separation unit; 18: arrival angle estimation unit; 20-*n*: FFT unit; 21-*n*: pilot extraction unit; 22-*n*: pilot generation unit; 23-*n*: division unit; 24-*n*: interpolation unit; 25-*n*: pseudonoise sequence generation unit; 26-*n*: despreading unit; 27-*n*: FFT unit; 31: threshold value determination unit, 32 delay time number discrimination unit; 50-*n*: IFFT unit; 51-*n*: delay time component removal unit; 52-*n*: FFT unit; 80: phase difference calculation unit; 81: arrival angle calculation unit; 101: CPU; 102: memory; 103-1, 103-2: input unit; 104: output unit; 105: bus.

What is claimed is:

1. A receiving apparatus for receiving radio waves transmitted from a transmitter, and estimating an arrival angle of a direct wave from the transmitter, comprising:
   first to N-th (N being an integer not less than 2) wireless reception units provided respectively corresponding to first to N-th antenna elements forming an array antenna, and performing frequency conversion and AD conversion on first to N-th analog signals obtained by receiving the radio waves by said first to N-th antenna elements, respectively, to output first to N-th digital signals;
   first to N-th transmission channel estimation units for estimating transmission channel frequency characteristics based on the first to N-th digital signals, respectively, and outputting first to N-th transmission channel estimation results;
   first to N-th wave removal units provided respectively corresponding to said first to N-th transmission channel estimation units, removing, from the first to N-th transmission channel estimation results, an arriving wave component corresponding to a particular delay time, and outputting first to N-th transmission channel frequency characteristics pertaining to the arriving waves of the delay times shorter than the particular delay time;
   a processor; and
   a memory storing instructions which, when executed by the processor, perform the following,
      estimating, by means of a super-resolution process, delay times of one or more arriving waves included in the radio waves, based on a transmission channel estimation result among the first to N-th transmission channel estimation results,
      comparing the estimated delay times with a threshold value, to determine whether the estimated delay times are shorter than the threshold value,
      determining the particular delay time as one of the estimated delay times that is equal to or more than the threshold value, thus causing the first to N-th delayed wave removal units to remove from the first to N-th transmission channel estimation results, the arriving wave component corresponding to the estimated delay time determined to be equal to or more than the threshold value, and output the first to N-th transmission channel frequency characteristics pertaining to the arriving waves of the estimated delay times determined to be shorter than the threshold value;
      respectively separating, from each other, arriving wave components included in the outputted first to N-th transmission channel frequency characteristics to extract first to N-th direct wave components; and
      estimating an arrival angle of the direct wave based on a phase difference among the first to N-th direct wave components.

2. The receiving apparatus as set forth in claim 1, wherein said super-resolution process is either of an MUSIC process and an ESPRIT process.

3. The receiving apparatus as set forth in claim 1, wherein each of said first to N-th delayed wave removal units
   performs inverse Fourier transform on the transmission channel estimation result output from the corresponding transmission channel estimation unit to generate a delay profile,
   performs a process of substituting 0 for the component corresponding to the particular delay time in the generated delay profile, and
   performs Fourier transform on the result of this process, to generate a transmission channel frequency characteristic pertaining to the arriving waves of delay times shorter than the predetermined delay time.

4. The receiving apparatus as set forth in claim 1, further comprising a pseudo-inverse matrix generation unit for generating a pseudo-inverse matrix using the estimated values of the delay times determined to be shorter than the threshold value, wherein
   the processor multiplies the transmission channel frequency characteristic outputted from each of the first to N-th delayed wave removal unit by the pseudo-inverse matrix, generates a column vector comprising as its elements, complex numbers representing the amplitudes and the phases of the arriving wave components of the delay times having been determined to be shorter than the threshold value, extracts the value at the top of the column vector, and outputs it as the direct wave component.

5. The receiving apparatus as set forth in claim 4, wherein when a matrix consisting of the estimated values of the delay times determined to be shorter than the threshold value is represented by X(hat)', the pseudo-inverse matrix is represented by:

$$\hat{X}^+ = (\hat{X}^H \hat{X})^{-1} \hat{X}^H$$

(here, the superscript "H" represents a complex conjugate transpose, and the superscript "−1" represents an inverse matrix).

6. The receiving apparatus as set forth in claim 1, further comprising a threshold value determination unit for determining the threshold value based on the estimated delay times, wherein
   the threshold value determined by said threshold value determination unit is used for the comparison of the estimated delay times.

7. The receiving apparatus as set forth in claim 6, wherein said threshold value determination unit determines the threshold value to be longer than the minimum value of the estimated delay times, and to be shorter than the maximum value of the estimated delay times.

8. The receiving apparatus as set forth in claim 1, further comprising a delay time number discrimination unit for determining whether the number of the estimated delay times is smaller than a predetermined number, wherein
   when the number of the estimated delay times is determined to be smaller than the predetermined number, the processor does not carry out the determination as to whether the estimated delay times are shorter than the threshold value, and each of said first to N-th delayed wave removal units does not carry out the removal of the arriving wave.

9. A receiving method in which radio waves transmitted from a transmitter are received, and an arrival angle of the direct wave from the transmitter is estimated, said method comprising:

performing frequency conversion and AD conversion on first to N-th analog signals obtained by receiving the radio waves by first to N-th (N being an integer not smaller than 2) antenna elements forming an array antenna, to generate first to N-th digital signals;

estimating transmission channel frequency characteristics based on the first to N-th digital signals, to output first to N-th transmission channel estimation results;

estimating, by means of a super-resolution process, delay times of one or more arriving waves included in the radio waves, based on a transmission channel estimation result among the first to N-th transmission channel estimation results;

comparing the estimated delay times with a threshold value, to determine whether the estimated delay times are shorter than the threshold value;

removing, from the first to N-th transmission channel estimation results, an arriving wave component corresponding to the delay time having been determined to be equal to or longer than the threshold value, and outputting first to N-th transmission channel frequency characteristics pertaining to the arriving waves of the delay times having been determined to be shorter than the threshold value;

separating, from each other, arriving wave components included in the first to N-th transmission channel frequency characteristics, to extract first to N-th direct wave components; and estimating an arrival angle of the direct wave based on a phase difference among the first to N-th direct wave components.

10. A non-transitory computer readable recording medium in which a program for causing a computer to execute processes in the receiving method as set forth in claim 9 is recorded.

11. The receiving apparatus as set forth in claim 4, further comprising a threshold value determination unit for determining the threshold value based on the estimated delay times, wherein the threshold value determined by said threshold value determination unit is used for the comparison of the estimated delay times.

12. The receiving apparatus as set forth in claim 4, further comprising a delay time number discrimination unit for determining whether the number of the estimated delay times is smaller than a predetermined number, wherein when the number of the estimated delay times is determined to be smaller than the predetermined number, the processor does not carry out the determination as to whether the estimated delay times are shorter than the threshold value, and each of said first to N-th delayed wave removal units does not carry out the removal of the arriving wave.

* * * * *